United States Patent [19]
Dunwoody et al.

[11] Patent Number: 5,825,284
[45] Date of Patent: Oct. 20, 1998

[54] SYSTEM AND METHOD FOR THE DETECTION OF VEHICLE ROLLOVER CONDITIONS

[75] Inventors: Andrew B. Dunwoody, Richmond, Canada; Donald S. Stern, San Jose, Calif.

[73] Assignee: Rollover Operations, LLC, Mercer Island, Wash.

[21] Appl. No.: 763,006

[22] Filed: Dec. 10, 1996

[51] Int. Cl.⁶ .................................................. B60Q 1/00
[52] U.S. Cl. ........................ 340/440; 340/438; 340/461; 340/525; 340/462
[58] Field of Search ................... 340/440, 438, 340/461, 459, 460, 462, 431, 433, 425.5, 525, 439, 979, 973; 280/707; 180/172, 197, 282, 283, 290; 701/29, 124

[56] References Cited

U.S. PATENT DOCUMENTS

| | | | |
|---|---|---|---|
| 4,078,224 | 3/1978 | Mize | 340/440 |
| 4,480,714 | 11/1984 | Yabuta et al. | 180/290 |
| 4,658,508 | 4/1987 | Oberg | 340/440 |
| 4,682,145 | 7/1987 | Brawner, Jr. | 340/440 |
| 4,722,547 | 2/1988 | Kishi et al. | 280/710 |
| 4,737,759 | 4/1988 | Stropkay et al. | 340/440 |
| 4,765,649 | 8/1988 | Ikemoto et al. | 280/707 |
| 5,032,821 | 7/1991 | Domanico et al. | 340/440 |
| 5,218,771 | 6/1993 | Redford | 33/366 |

FOREIGN PATENT DOCUMENTS

| | | |
|---|---|---|
| 0 607 516 A2 | 7/1994 | European Pat. Off. . |
| 0 684 150 A1 | 11/1995 | European Pat. Off. . |
| 2 689 463 | 10/1993 | France . |
| 63 116918 A | 5/1988 | Japan . |
| 02 299919 A | 12/1990 | Japan . |
| 04 128521 A | 4/1992 | Japan . |
| 04 191179 A | 7/1992 | Japan . |
| 05 124543 A | 5/1993 | Japan . |
| 06 297985 A | 10/1994 | Japan . |
| 2088606 | 6/1982 | United Kingdom .................. 340/440 |
| WO8403262 | 8/1984 | United Kingdom .................. 340/440 |

*Primary Examiner*—Jeffrey A. Hofsass
*Assistant Examiner*—Sihong Huang
*Attorney, Agent, or Firm*—Seed and Berry LLP

[57] ABSTRACT

A system uses multiple tilt sensors mounted to the vehicle frame and the vehicle suspension system to detect lateral acceleration and lateral load transfer. The system uses these measurements to determine a lateral load transfer ratio indicative of an actual roll moment compared to a maximum roll moment. The measurements from the tilt sensors are also used to calculate an effective center of gravity height. A display coupled to the system provides the vehicle operator with a read out of the load transfer ratio and effective center of gravity height. The display enables the vehicle operator to more completely understand the nature of the vehicle load and thereby allow the vehicle operator to avoid conditions likely to lead to a vehicle rollover accident.

50 Claims, 7 Drawing Sheets

SYSTEM AND METHOD FOR THE DETECTION OF VEHICLE ROLLOVER CONDITIONS

TECHNICAL FIELD

The present invention relates generally to vehicle safety and, more particularly, to a system and method for the detection of conditions leading to vehicle rollover.

BACKGROUND OF THE INVENTION

The rollover of vehicles, such as heavy trucks and tractor-trailer combinations, is a serious safety concern. Rollover accidents are the single largest cause to fatalities in the road transport industry and are responsible for most of the bulk spillage of hazardous materials. Heavy trucks and other vehicles are susceptible to rollover accidents because of the high center of gravity relative to the vehicle width. Economic and regulatory conditions are unlikely to change in a manner that would reduce the occurrence of rollover accidents.

The frequency of rollover accidents may be reduced with technology such as active suspension systems. However, such technologies are expensive. Furthermore, as a practical matter, the weight and power consumption of active suspensions limit their usefulness.

Another approach to reducing the frequency of rollover accidents is to provide data to drivers to indicate when a rollover accident is likely to occur. However, at highway speeds, a tractor-trailer combination covers its own length in less than a second. For this reason, detection systems alone cannot effectively predict when a rollover accident is about to occur. However, data can be provided to the driver to permit the driver to assess the likelihood of rollover conditions.

Conventional approaches to this problem are known in the art. For example, the system described in U.S. Pat. No. 4,078,224, to Mize, describes a technique where strain gauge sensors are installed on opposing ends of the suspension unit of a vehicle. The opposing strain gauge sensors provide a differential measure of distortion induced by the weight of the vehicle. The differential signal can be quantified to provide an indication of the transverse weight shift of the vehicle from one side to another. However, the transverse weight shift alone does not provide the vehicle operator with sufficient information to determine whether the vehicle is about to roll over.

Furthermore, this approach requires the installation of strain gauge sensors on the tractor-trailer where the sensors are exposed to the elements and may require frequent replacement. Such an approach is cost prohibitive. The system disclosed in U.S. Pat. No. 4,078,224 is particularly effective to indicate that a rollover has commenced. However, it is of minimal value to a driver to confirm that a rollover accident has commenced since the driver can no longer take steps to prevent the rollover accident.

Another technique, disclosed in U.S. Pat. No. 4,722,547, uses ultrasonic transducers on opposite sides of the vehicle. The ultrasonic transducers monitor the distance from the roadway and permit an active suspension system. Again, such techniques are relatively expensive to implement, particularly for a large number of tractor-trailer combinations already on the roads today.

Therefore, it can be appreciated that there is a significant need for a cost effective system and method to detect the presence of rollover conditions and provide the driver with data that can be used to prevent a rollover accident from occurring. The present invention provides this and other advantages as will be apparent from the following description and accompanying figures.

SUMMARY OF THE INVENTION

The present invention is embodied in a system and method for the detection of vehicle rollover conditions. The system comprises a sensor assembly coupled to the vehicle to generate signals indicative of a lateral load transfer of the vehicle and a lateral acceleration of the vehicle. A roll moment calculator coupled to the sensor assembly calculates a roll moment based on signals from the sensor assembly. A center of gravity calculator, also coupled to the sensor assembly, calculates an effective center of gravity of the vehicle. A roll moment display coupled to the roll moment calculator provides a visual indication of the calculated roll moment. A center of gravity display provides a visual indication of the calculated effective center of gravity of the vehicle to provide an indication of the likelihood of the vehicle to roll over.

In a preferred embodiment, roll moment calculator and center of gravity calculator are portions of a single processor. The processor calculates a lateral load transfer ratio indicative of an actual roll moment compared to a maximum roll moment, with the display indicating the lateral load transfer ratio.

In one embodiment, the sensor assembly includes three independent sensor units. The first sensor unit is mounted to the frame to generate signals indicative of lateral acceleration of the vehicle body. The second and third sensor units are oriented to generate signals indicative of lateral load transfer in the suspension system. The second and third sensor units may be mounted on opposing sides of the vehicle axle to generate signals indicative of load transfer from one side of the vehicle axle to the opposing side of the vehicle axle. The second and third sensor units may be processed to generate a differential signal used to determine the lateral load transfer.

In an alternative embodiment, the sensor assembly comprises two sensor units. The first sensor unit is coupled to the frame to detect lateral acceleration while the second sensor unit is mounted on the vehicle axle. The first and second sensor units are used to detect load transfer from one side of the vehicle axle to the opposing side of the vehicle axle.

The calculated data may be advantageously displayed as bar graph displays wherein the lateral load transfer is indicated by a bar graph having a substantially horizontal display orientation and the effective center of gravity of the vehicle is displayed on a bar graph having a substantially vertical display orientation. The roll moment display and center of gravity display may be portions of a single display. The display may be a color display unit wherein the lateral load transfer is displayed in a first color when below a predetermined threshold and displayed in a second color when the lateral load transfer is above the predetermined threshold. The system may also include an audio transducer to generate an alert signal when the lateral load transfer is above a predetermined threshold.

The sensor assembly is typically associated with the drive axle of the vehicle to generate signals indicative of lateral acceleration and lateral load transfer at the drive axle. When the vehicle is a semi-tractor-trailer combination, having at least one drive axle, the sensor assembly is mounted in proximity with the drive axle to generate signals indicative of lateral acceleration and lateral load transfer at the drive axle. When the tractor-trailer combination includes a plurality of trailer portions, each having an axle, the sensor assembly may be mounted in proximity with the axle of at least one of the trailer axles to generate signals indicative of lateral acceleration and lateral load transfer at the trailer axle. The system may also include a plurality of sensor assemblies mounted in proximity with at least two of the plurality of trailer portion axles to generate signals indicative of lateral acceleration and lateral load transfer at the trailer portion axles.

The system may further include a gating signal applied to the processor wherein the processor calculates the effective center of gravity only when the gating signal is applied. The gating signal may be applied to the processor when the lateral acceleration of the vehicle is above a predetermined threshold. The system may also include a data storage location to store the calculated center of gravity when the gating signal is not applied to the processor. The display indicates the calculated center of gravity when the gating signal is applied and indicates the stored calculated center of gravity when the gating signal is not applied.

DETAILED DESCRIPTION OF THE INVENTION

Figure 1A:
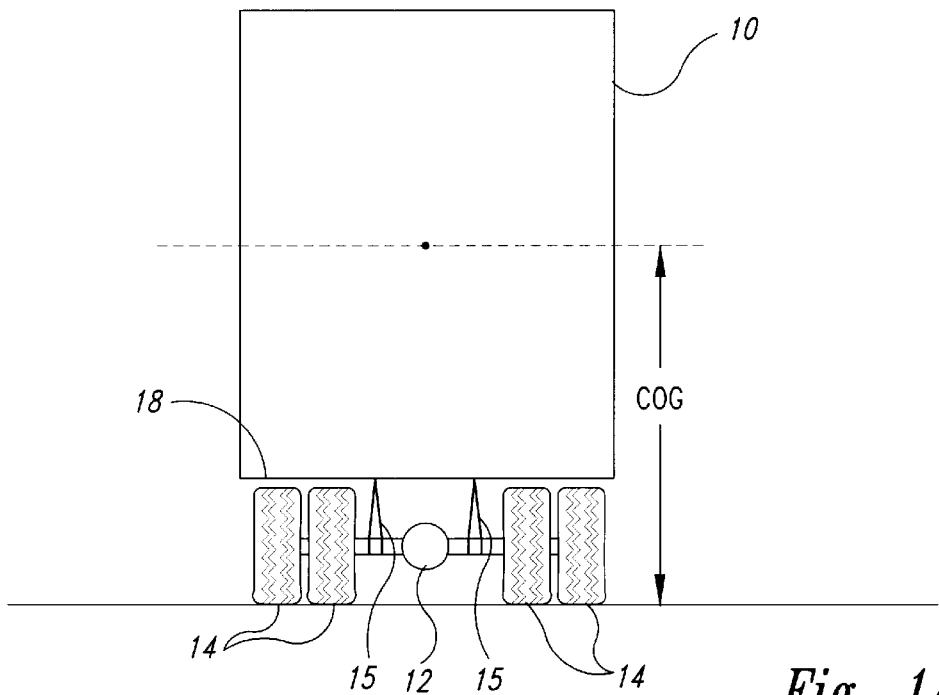
FIG. 1A is a rear view of a conventional semi-tractor-trailer combination during normal operation.
Figure 1B:
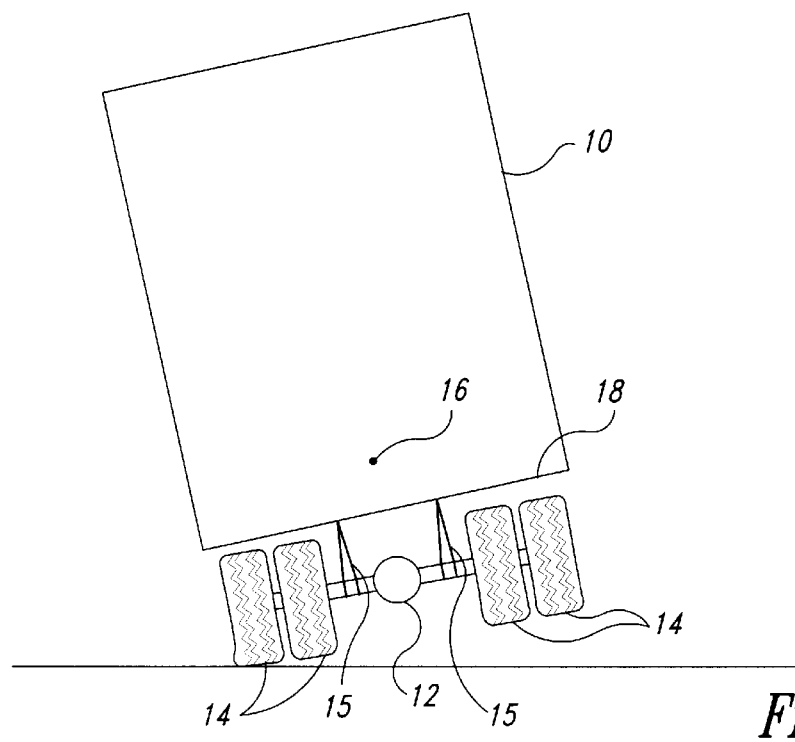
FIG. 1B is a rear view of the semi-tractor-trailer combination of FIG. 1A when attempting to perform a right-hand turn at an excessive velocity.

Vehicle rollover accidents commonly occur when the vehicle is attempting to turn at an excessive rate of speed. As illustrated in FIG. 1A, a vehicle 10, such as a semi-tractor-trailer, has a center of gravity (COG),which varies depending on the load carried within the vehicle 10. The vehicle 10 includes an axle 12, tires 14, suspension system 15, and frame 18 to which various forces are applied. When the vehicle 10 is moving in a straight line, the various forces to the axle 12 cancel each other. However, if the vehicle 10 is performing a turn, such as illustrated in FIG. 1B, forces are applied to the axle 12 that are uncanceled. Specifically, the vehicle 10 in FIG. 1B is illustrated as executing a turn to the right. Such a turn causes a lateral acceleration thereby generating a roll moment about a roll axis 16. If the roll moment is sufficiently large, the tires 14 on the right side of the axle 12 lift off the ground and the vehicle 10 rolls over. As those skilled in the art can appreciate, the roll moment is dependent on both the lateral acceleration and the center of gravity. A high center of gravity will cause a greater roll moment than a low center of gravity. A large lateral acceleration causes a greater roll moment than a low lateral acceleration.

To reduce the incidence of rollover accidents, it is necessary to either increase the maximum rollover moment that can be withstood by the vehicle 10 or to decrease the applied rollover moment. Unfortunately, neither of these quantities can be easily altered. As noted above, there are no known practical solutions to prevent vehicle rollover accidents. Some attempts have been made to provide data to the driver in an effort to warn of an impending vehicle rollover. However, the typical warning system provides only limited information to the driver, and may provide information too late to be of any practical value.

As noted above, the vehicle will roll over when the roll moment is sufficiently large. As is known, an increased center of gravity results in an increased roll moment for a given lateral acceleration. The system of Mize, discussed in the background section, does not provide sufficient data to provide the vehicle operator with an indication of the tendency of the vehicle to roll over.

The present invention uses sensors to measure the weight applied to each of the vehicle's drive wheels and to measure lateral acceleration. Based on these measurements, the system calculates the center of gravity of the vehicle and the lateral load transfer between the wheels of the axle 12. The present invention is embodied in a system 100, illustrated in the functional block diagram of FIG. 2A that provides the vehicle operator with an indication of the height of center of gravity of the vehicle 10 and the lateral load transfer between the wheels of the axle 12. The system 100 may also be used as a monitor device to detect potentially dangerous driving habits of the vehicle operator. For example, the system 100 can monitor the lateral acceleration and lateral load transfer and, if the monitored parameters exceed a predetermined threshold, the system 100 can store the parameter values in a memory each time the predetermined threshold is exceeded. The memory can retain and display these data values at a later time. For example, the system 100 may be installed on a school bus and monitored periodically, such as weekly. The memory can display the number of times during the previous week that the lateral acceleration and lateral load transfer exceeded the predetermined threshold. In this manner, potentially dangerous driving habits of the school bus driver may be detected and appropriate measures taken to prevent possible rollover accidents.

The system 100 includes a central processing unit (CPU) 102, which may be a conventional microprocessor, embedded controller, or the like. A memory 104 may include both random access memory (RAM) and read-only memory (ROM). A roll moment calculator 105 calculates a roll moment of the vehicle 10. A center of gravity calculator 106 calculates a center of gravity of the vehicle 10. In an exemplary embodiment, the functions of roll moment calculator 105 and center of gravity calculator 106 are performed by the CPU 102.

A display 108 provides the vehicle operator with indications of the center of gravity of the vehicle and of the lateral load transfer. In an exemplary embodiment, the lateral load transfer is displayed as a ratio of the difference in the loads carried by the two sides of the axle 12 to the total axle load. A lateral load transfer ratio (LTR) of 1 indicates that the wheels on one side of the axle 12 are lifted off the ground. An LTR of −1 indicates that the wheels on the other side of the axle 12 are lifted off the ground.

Figure 2A:
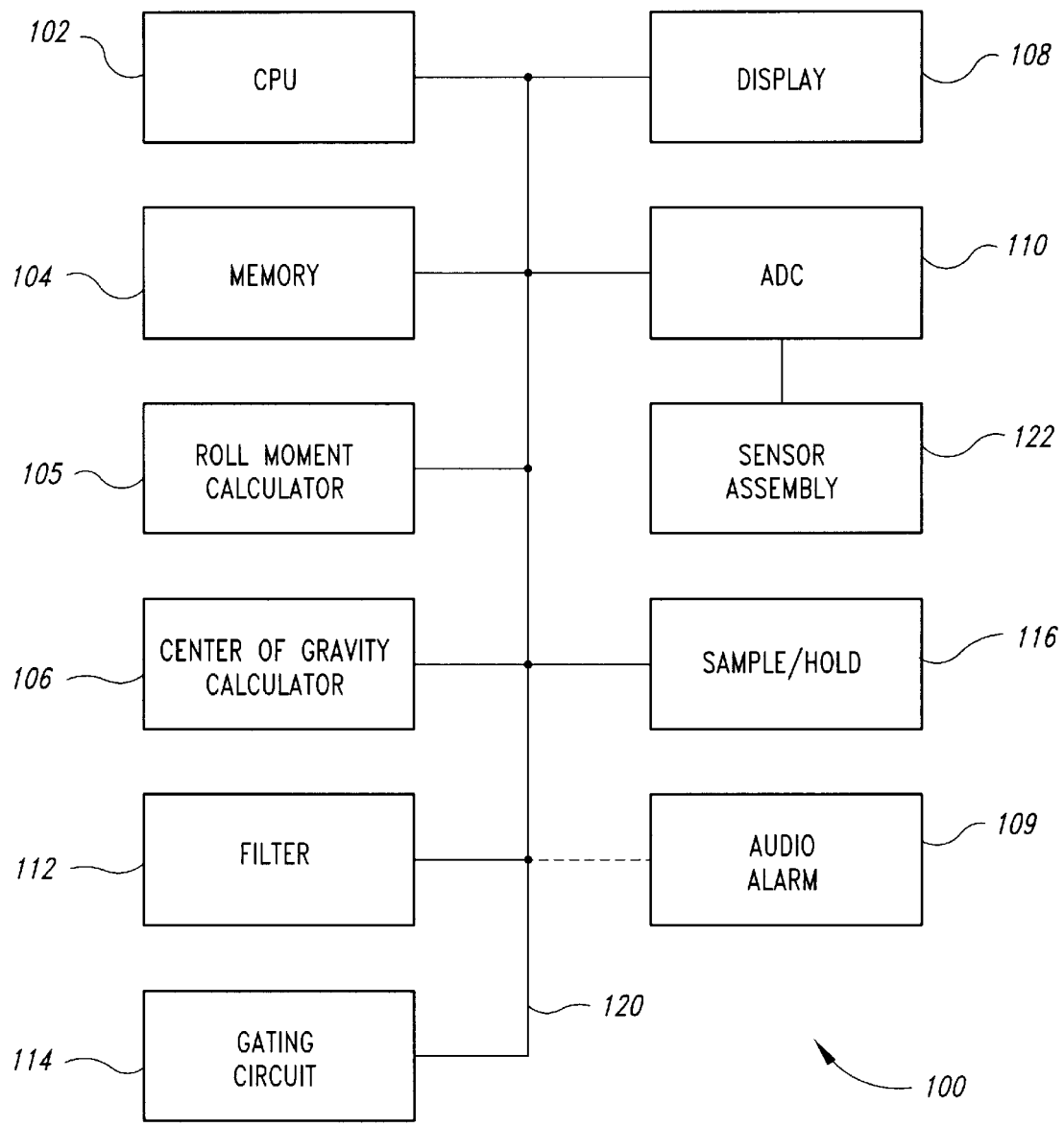
FIG. 2A is a functional block diagram of the system of the present invention.
Figure 2B:
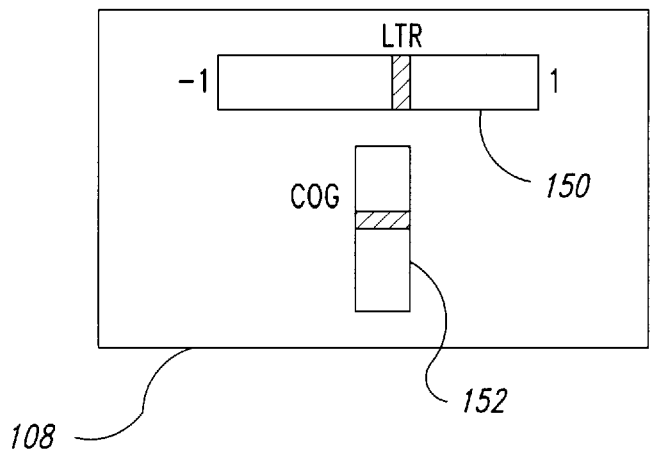
FIG. 2B illustrates one embodiment of the display used by the system of FIG. 2A.
Figure 2C:
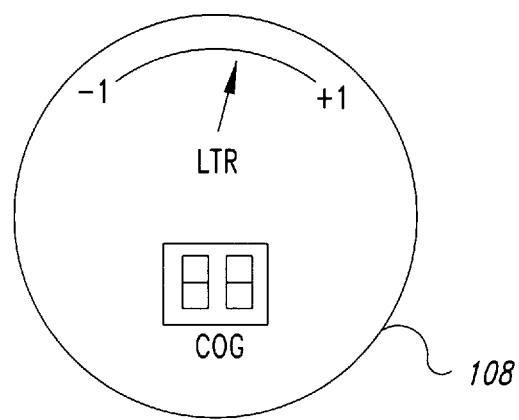
FIG. 2C illustrates an alternative embodiment of the display used by the system of FIG. 2A.

FIG. 2B illustrates one embodiment of the display 108. The load transfer ratio is displayed on a bar graph 150 having a substantially horizontal orientation to permit easy interpretation by the vehicle operator. The center of gravity height is displayed on a bar graph 152 having a substantially vertical orientation to permit easy interpretation by the vehicle operator. If the display 108 is a color display, the load transfer ratio may be displayed on one color of below a predetermined threshold and displayed with a different color if above the predetermined threshold. An alternative embodiment of the display 108 is illustrated in FIG. 2C where a conventional gauge, either digital or analog, displays the load transfer ratio. The center of gravity height may be displayed as a numeric read out in relative units, or absolute units, such as feet. The system 100 may also include an optional audio alarm 109 to provide an audible indication to the vehicle operator when the load transfer ratio exceeds predetermined threshold.

The system 100 also includes an analog-to-digital converter (ADC) 110 that converts analog input data to digital form for processing by the CPU 102. The data digitized by the ADC 110 is filtered by a filter 112. The filter 112 presently employed by the system 100 is a digital low pass filter with a cut off frequency of 2 Hertz. The low cut off frequency serves to eliminate stray noise and to eliminate the effects of vibrations caused by natural resonances in the suspension system 15, which are typically around 10 Hertz. The system 100 also includes a gating circuit 114 and a sample/hold circuit 116 used to display the effective center of gravity. As will be discussed in detail below, the effective center of gravity of the vehicle 10 is calculated based on measured parameters, including the lateral acceleration of the vehicle frame 18 (see FIGS. 1A and 1B). However, when the vehicle 10 is in motion with little or no lateral acceleration, the effective center of gravity will appear to decrease due to the decrease in lateral acceleration. Therefore, the gating circuit 114 provides an indication to the CPU 102 when the lateral acceleration is above a predetermined threshold. The CPU 102 thus calculates the effective center of gravity height only when the gating signal is applied, indicating that the lateral acceleration is above the predetermined threshold. The sample and hold circuit 116 uses the currently calculated effective center of gravity when the gating circuit 114 indicates that the lateral acceleration is above the predetermined threshold. However, the sample and hold circuit 116 retains the last calculated value for the effective center of gravity height when the gating circuit 114 indicates that the lateral acceleration is not above the predetermined threshold. Thus, the sample and hold circuit 116 updates the calculated effective center of gravity height when the lateral acceleration is above the predetermined threshold and stores the last valid calculated center of gravity measurement when the lateral acceleration is not above the predetermined threshold.

Alternatively, the vehicle operator can manually depress a button (not shown) when the vehicle 10 is undergoing lateral acceleration to activate the gating circuit 114. In this embodiment, the CPU 102 calculates the effective center of gravity in response to the manual activation of the gating circuit 114 via the button (not shown). The sample and hold circuit 116 stores the single value calculated by the CPU for the effective center of gravity height. The display 108 is configured to display the current value for the effective center of gravity height if the gating circuit 114 is active, and display the stored value in the sample and hold circuit 116 if the gating circuit 114 is not active. The various components are connected by a bus system 120, which may carry power, status signals, and control signals in addition to data.

It should be noted that many of the components of the system 100 illustrated in the functional block diagram of FIG. 2A are incorporated into the CPU 102. For example, the filter 112, gating circuit 114, and sample and hold circuit 116 may be implemented by appropriate computer instructions stored in the memory 104 and executed by the CPU 102. Furthermore, the data storage area that is part of the sample and hold circuit 116 may be a storage register within the CPU 102 or a storage location in the memory 104. Thus, many components of the system 100 may be implemented by appropriate instructions executed by the CPU 102. However, FIG. 2A illustrates these components as independent functional block since each performs a separate task.

A sensor assembly 122 is used to provide data indicative of the load transfer and lateral acceleration. In a preferred embodiment, the sensor assembly 122 uses two or more independent sensor units such as the optical tilt sensor units illustrated in U.S. Pat. No. 5,218,771 (the '771 patent), which is presently assigned to TV Interactive Data Corporation. The sensors described in that patent provide a low cost and rugged detection unit to indicate the orientation of the sensor unit. With one sensor mounted on the frame of the vehicle 10 and another mounted on the suspension, the roll angle of the frame relative to the axle can be determined. Other factors, such as the roll stiffness of the suspension, the truck mass, and the lateral acceleration can be used to calculate the center of gravity of the vehicle 10. The roll stiffness of the suspension, and the height of the roll center of the suspension are characteristics that can be estimated and entered into the system 100.

As described in the '771 patent, each sensor unit contains a transparent cylindrical container with a bubble suspended in liquid. One end of the cylindrical container contains an infrared LED which illuminates the bubble. On both sides of the cylindrical container are photodiodes. When the sensor unit is in the horizontal position, the bubble is centered between the two photodiodes. The bubble acts like a reflective lens and reflects light to the two photodiodes. The bubble acts like a reflective lens and reflects light to the two photodiodes. When the sensor unit is level and the bubble is between the two photodiodes, the sensor produces a level indication. As the sensor unit is rotated, the bubble remains stationary and gradually redirects the light toward one photodiode and away from the other. As the reflected light changes, the output of the sensor unit changes proportionately. The sensor output is linearly proportional to the amount of incident light. The output signal of the sensor unit is fed into the ADC 110 (see FIG. 2A) to produce a pulse width modulated waveform which is sent to the CPU 102. The CPU 102 measures the width of the pulse and derives the absolute angular position of the sensor unit. Using a ratiometric photodiode circuit allows for a low cost ADC 110 that is insensitive to noise, temperature and other environmental factors.

The sensor units are configured so that they produce a count value that indicates the relative tilt of the sensor. If the sensor unit is tilted so that the side with the cable coming out of it is lower than the opposite side, then the count will decrease indicating a negative angle or movement from the flat "zero" position. If the sensor unit is tilted in the other direction so that the cable side is higher than the opposite side, the count will increase indicating a positive angle or movement from the "zero" position.

Each sensor unit is contained in a small box with a shielded cable leading to a central junction box (not shown). The junction box is then connected to the cab and power system of the vehicle 10. In one embodiment, the junction box contains a small microprocessor (not shown) which measures each sensor unit in the manner described above and transmits the resulting data to the vehicle's cab for interface to the CPU 102. In a preferred embodiment, the CPU 102 processes data for both the sensor assembly 122 and the display 108.

Figure 6:
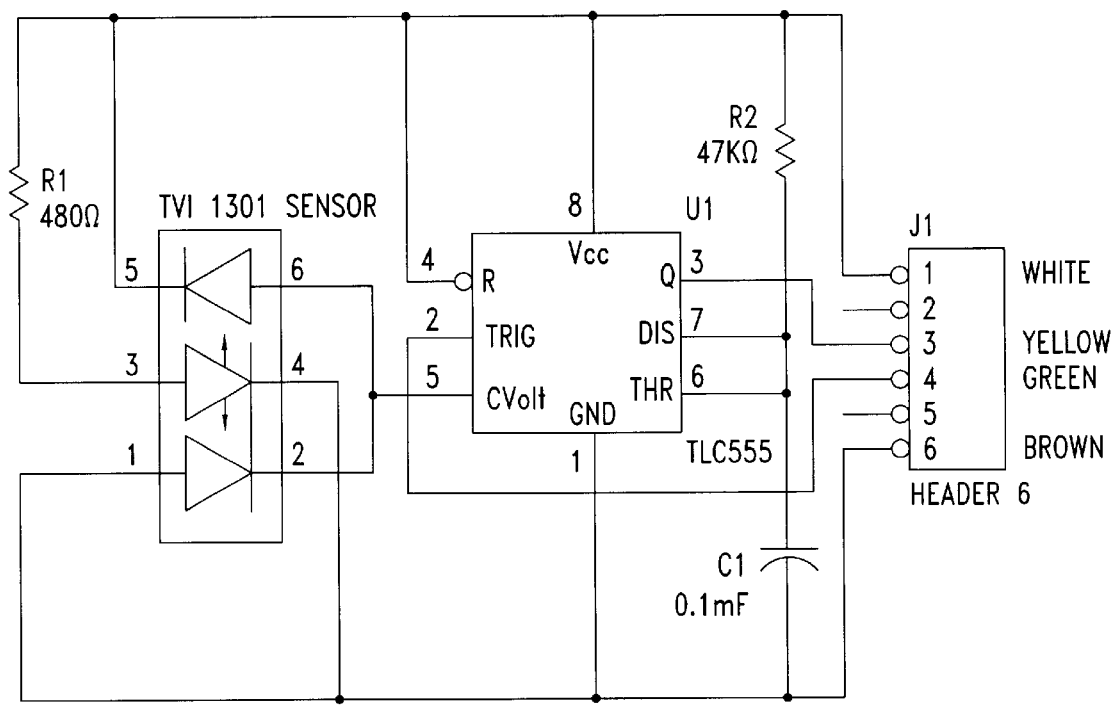
FIG. 6 is a schematic of one embodiment of a sensor unit used with the system of FIG. 2A.

As will be discussed in detail below, the sensor assembly 122 comprises two or more individual sensor units. FIG. 6 is a schematic diagram of one sensor unit constructed in accordance with the '771 patent. The sensor unit contains an LED and two photodiodes mounted in proximity with the transparent cylindrical container. The output from the photodiodes is used to modulate the input of a TLC555 timer to produce a pulse-width modulated output signal. The operation of the TLC555 timer for such purposes is well known and need not be described herein. Based on the pulse-width modulation output, it is possible to precisely determine the angular orientation of the bubble within the cylindrical container. The system 100 uses the orientation of two or more individual sensor units to provide an indication of lateral load transfer and lateral acceleration.

The advantage of the orientation sensing apparatus of the '771 patent is its relatively low cost and ruggedness for operation in the hostile environment of the vehicle suspension system 15 (see FIGS. 1A and 1B). The liquid contained within the sensor units maintains a constant viscosity over the wide operating temperature range encountered by the vehicle 10. Furthermore, each sensor unit is self-contained and sealed, thus eliminating the adverse effects of contaminants such as dirt and water.

Although the optical sensing units described in the '771 patent are used in a preferred embodiment, the system 100 may be successfully implemented using a variety of sensors. For example, the sensor assembly 122 may be comprised of two or more rotary variable differential transformer (RVDT) sensing units. As is known in the art, an RVDT sensing unit generates an electrical signal that varies in response to the rotary position of a sensing element. Other types of sensor units useful in the system 100 include a rotary potentiometer, optical encoders, strain gauges, and the like. In addition, conventional computer input devices may also be used in the sensor assembly 122. For example, it is known in the use of multi-media computers to utilize a glove in which fiber optic cables are attached to fingers of the glove. As the user bends the fingers the fiber optic cable is bent, thus increasing the curvature of the cable, resulting in the corresponding decrease in the amount of light transmitted through the fiber optic cable. A fiber optic system can be employed by the sensor assembly 122 to determine the tilt angle of the axle 12 and thus provide a measure of the lateral load transfer. A conventional accelerometer can provide an indication of lateral acceleration. The present invention is not limited by the specific form of the sensor assembly 122.

Research has indicated that it is possible to recover from a potential vehicle rollover when the tires on one side of a non-drive axle become unloaded and lift off the road surface. In contrast, it has been found that a vehicle rollover becomes unrecoverable when the tires 14 on one side of the drive axle become unloaded and lift off the road surface. For this reason, the sensor assembly 122 is typically associated with the drive axle 12 of the vehicle 10. If the vehicle 10 is a tractor-trailer combination, the sensor assembly 122 is generally mounted on one of the drive axles of the tractor. However, multiple trailer combinations, sometimes called a train, are not uncommon on the roadway. With a multiple tractor-trailer combination, research has indicated that rollover accidents tend to begin initially with the axle of the rearmost trailer. With a multiple tractor-trailer combination, the sensor assembly 122 may be associated with the axle of the rearmost trailer portion. It is also possible to mount a plurality of sensor assemblies 122 on one or more axles of the vehicle 10. In this embodiment, the CPU 102 analyzes data from each of the sensor assemblies 122. The display 108 is configured to display only the greatest LTR calculated by the CPU 102.

The basis for the estimation of both the height of the center of gravity and the lateral load transfer ratio is the measurement of the forces transferred between the tires 14 and the road. Direct measurement of these forces would require sensors located between the tires 14 and the road surface. Thus, while the direct measurement of forces is not possible, a free-body analysis of a single axle shows that the forces for that axle between the tires and the road may be inferred from the measurement of the forces and moments between the frame of the vehicle and the axle. From those measurements, the LTR and center of gravity may be calculated. The combination of the LTR and center of gravity can be used by the vehicle operator to determine the sensitivity of the vehicle 10 to a rollover. For example, a high center of gravity may result in vehicle rollover even at low lateral accelerations.

Prior to a detailed discussion of the system 100, a brief discussion of the physics involved in vehicle rollovers is warranted. As discussed above, a rollover occurs when a roll moment, applied to the vehicle through the roll center 16, exceeds the maximum moment which can be applied to the vehicle 10 by the road through the tires 14. When the applied moment exceeds the maximum moment, the inside wheels of first one axle, then the rest of the axles in turn, lift off of the pavement and a rollover commences.

Figure 3:
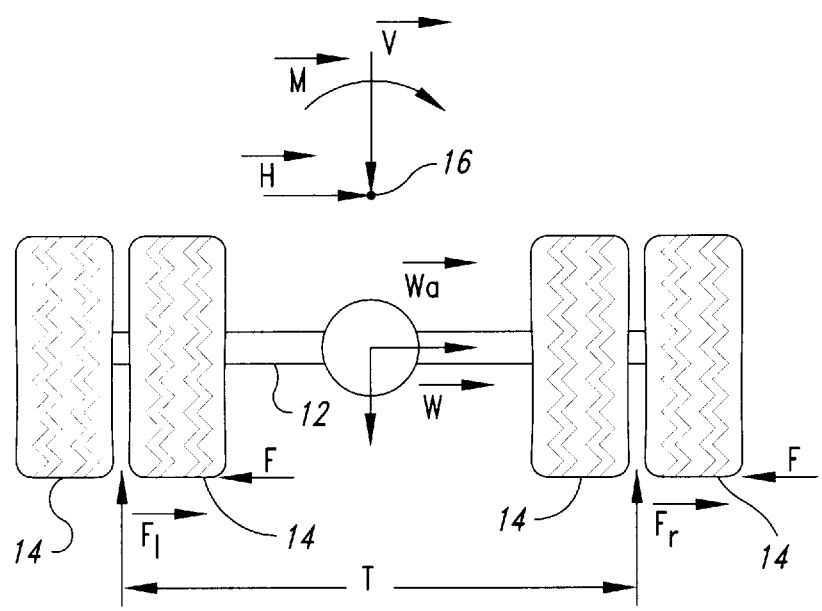
FIG. 3 is a free-body diagram of a drive axle illustrating parameters measured by the system of FIG. 2A.

FIG. 3 illustrates the forces and moments acting upon one axle 12. The vectors $\vec{V}$, $\vec{H}$, and $\vec{M}$ represent the vertical forces, horizontal forces, and the moment, respectively, applied by the suspension system 15 (see FIGS. 1A and 1B) onto the axle 12. The vectors $\vec{F}_l$ and $\vec{F}_r$ represent the vertical forces applied to tires 14 on the left and right sides of the axle 12, respectively. The horizontal contact forces (i.e., friction) between the tires 14 and the road surface are illustrated in FIG. 3, but are not directly related to the present analysis. In addition, minor forces on the axle 12 itself are indicated by the vectors $\vec{W}$ and $\vec{W}a$. The vector $\vec{W}$ indicates the weight of the axle 12, and the term $\vec{W}a$ indicates the centrifugal force exerted by the axle where a is the lateral acceleration, measured in "g's." The forces exerted by the suspension on the axle 12 (i.e., $\vec{V}$, $\vec{H}$, and $\vec{M}$) are taken as acting through the roll center 16 of the suspension. The vertical tire forces (i.e., $\vec{F}_l$ and $\vec{F}_r$) are taken as acting through the center of tire contact patches on each side of the axle 12, a distance T apart. It should be noted that FIG. 3 illustrates the operation of forces with the assumption that the road surface is horizontal. However, the analysis applies where the road is sloped. In the case of a sloped road, the terms horizontal and vertical are interpreted as being parallel to and perpendicular to the local road slope.

The center line of the axle 12 will generally be at an angle to the horizontal due to the flexibility of the tires 14 and the different loads carried by each side of the axle. Assuming that tire deflection can be modeled as a linear function of the load, the axle angle is related to the vertical tire loads (i.e., $\vec{F}_l$ and $\vec{F}_r$) by the following:

$$\tan \alpha = \frac{\vec{F}_r - \vec{F}_l}{K_t T} \tag{1}$$

where $\alpha$ is the axle angle, $\vec{F}_l$ and $\vec{F}_r$ are the left and right tire forces, respectively, $K_t$ is a measure of stiffness of the tires 14, and T is the distance between the centers of the tires 14 on each side of the axle 12. It should be noted that equation (1) applies so long as the tires 14 on both sides of the axle 12 are in contact with the road surface.

The relationship between the moment $\vec{M}$, horizontal force $\vec{H}$, and vertical force $\vec{V}$ between the axle 12 and suspension system 15 (see FIGS. 1A and 1B) and the distribution of tire loads is given by:

$$\vec{M} + \vec{H}h_{rc} + \vec{V}h_{rc}\tan \alpha + \vec{W}h_{cga}\tan \alpha + \vec{W}ah_{cg} = (\vec{F}_r - \vec{F}_l)\frac{T}{2} \tag{2}$$

where $\vec{M}$ is the moment, $\vec{H}$ is the horizontal force caused by turning of the vehicle 10, $h_{rc}$ is the height of the roll center 16, $\vec{W}$ is the weight of the axle, $\vec{W}a$ is the centrifugal force exerted by the axle under the influence of lateral acceleration a, and $h_{cga}$ is the height of the center of gravity of the axle 12.

Equations (1) and (2) may be combined to solve for the difference in forces exerted on the tires (i.e., $\vec{F}_r - \vec{F}_l$). However, some factors in equations (1) and (2) can be ignored, thus simplifying the calculations performed by the CPU 102 (see FIG. 2A). Specifically, the axle angle $\alpha$ is sufficiently small in all practical situations that the tangent of $\alpha$ is approximately zero. Furthermore, the weight $\vec{W}$ of the axle 12 is insignificant when compared with the weight of the load in a typical tractor-trailer. Therefore, these terms may be ignored, and equation (2) is simplified as shown below:

$$\vec{M} + \vec{H}h_{rc} = (\vec{F}_r - \vec{F}_l)\frac{T}{2} \tag{3}$$

where all terms have been previously defined. Equation (3) may be manipulated to provide an indication of the difference in tire contact forces using the following:

$$\vec{F}_r - \vec{F}_l = (\vec{M} + \vec{H}h_{rc})\frac{2}{T} \tag{4}$$

where all terms have been previously defined.

Equation (4) defines the difference in tire contact forces. The sum of tire contact forces equals the sum of the vertical load $\vec{V}$ from the frame of the vehicle 10 and the weight $\vec{W}$ of the axle 12. This is represented in equation (5) below:

$$\vec{F}_r + \vec{F}_l = \vec{V} + \vec{W} \tag{5}$$

where all terms have been previously defined. As stated above, the weight $\vec{W}$ of the axle 12 is insignificant compared with the typical vertical load $\vec{V}$. Thus, the contribution of the axle weight $\vec{W}$ in equation (5) can be ignored. The lateral load transfer ratio (LTR) is a function of the left-right tire forces, given by the following:

$$LTR = \frac{\vec{F}_r - \vec{F}_l}{\vec{F}_r + \vec{F}_l} \tag{6}$$

where LTR is the lateral load transfer ratio, and all other terms have been previously defined.

The height of the center of gravity of the vehicle 10 can be approximated by the following:

$$h_{cgv} = LTR \frac{T}{2a} \tag{7}$$

where $h_{cgv}$ is the effective height of the center of gravity of the vehicle 10, a is the lateral acceleration, LTR is the lateral load transfer ratio, defined in equation (6) above, and T is the distance between the center of the tires 14 on each side of the axle 12. As discussed above, the CPU 102 (see FIG. 2A) uses the gating circuit 114 such that the effective height of the center of gravity $h_{cgv}$ is calculated only when the lateral acceleration a is above a predetermined threshold. When the lateral acceleration a is below the predetermined threshold, the sample and hold 116 maintains the previous value for the effective height of the center of gravity. The formula in equation (7) above approximates the height of the center of gravity. Factors, such as the rolling of the vehicle frame 18 (see Figures 1A and 1B), may cause a lateral shift that causes the calculated center of gravity to appear higher than the real center of gravity. However, such errors are considered minimal and may be disregarded. Thus, equation (7) provides a measure of the effective height of the center of gravity, which is a sufficiently close approximation to the real height of the center of gravity.

The display 108 (see FIG. 2A) provides the vehicle operator with an indication of the LTR of the vehicle 10 and the effective center of gravity $h_{cgv}$ of the vehicle. Thus, the results of equations (6) and (7) above are displayed for the vehicle operator. To calculate the LTR, equations (4) and (5) must be solved. The height of the roll center $h_{rc}$ 16 of the vehicle 10 and the distance T between the contact patches of the tires 14 are fixed parameters that can be measured for a specific vehicle and will not change. Other parameters, such as the weight $\vec{W}$ of the axle 12, are fixed parameters, but may be safely ignored. Finally, variable parameters, such as the roll moment $\vec{M}$, the horizontal applied force $\vec{H}$, and the vertical applied force $\vec{V}$ are measured by the sensor assembly 122.

Figure 4:
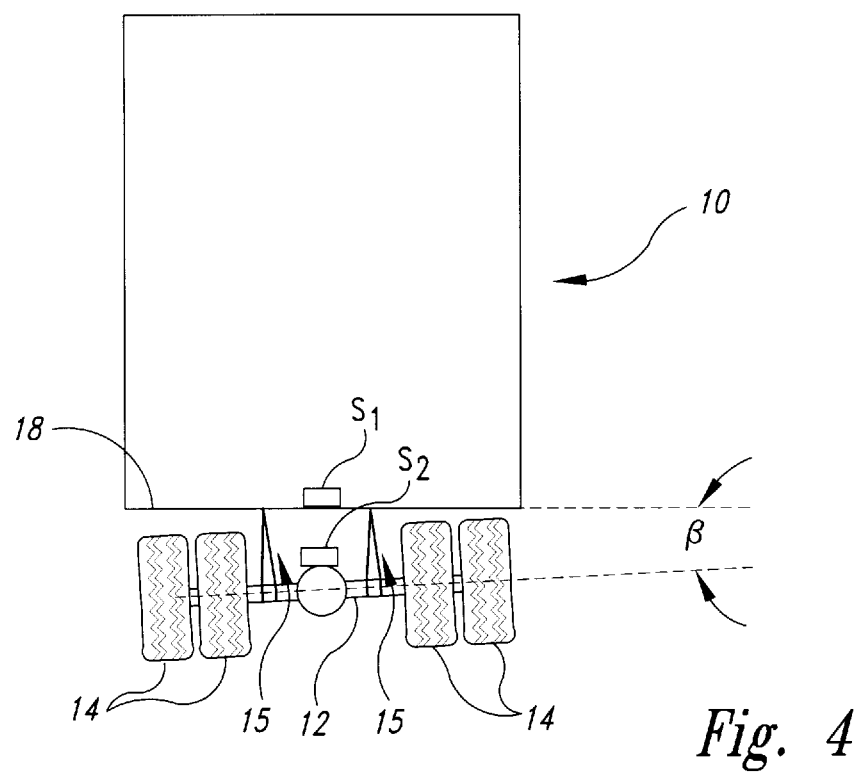
FIG. 4 is a rear view of a semi-tractor-trailer combination illustrating the placement of sensor units with the system of FIG. 2A.

The roll moment $\vec{M}$ is calculated by the following:

$$\vec{M} = k_s\beta + C_s\frac{d\beta}{dt} \tag{8}$$

where $\vec{M}$ is the roll moment $k_s$ is a constant indicative of the roll stiffness of the suspension system, $\beta$ is an angle between the axle 12 and frame 18 of the vehicle 10, $C_s$ is a constant indicative of the roll damping of the suspension and $$\frac{d\beta}{dt}$$

is the rate of change of $\beta$ with respect to time. The angle $\beta$ may be determined in several different manners. In one embodiment, illustrated in FIG. 4, a first sensor unit $S_1$ is mounted on the frame 18 of the vehicle 10 while a second sensor unit $S_2$ is mounted on the axle 12. The first and second sensor units $S_1$ and $S_2$ provide an indication of the tilt angle of the frame 18 and the tilt angle of the axle 12, respectively. The difference between the tilt angles measured by the first and second sensor units $S_1$ and $S_2$, respectively, provide a direct measure of the angle $\beta$. However, the configuration of the sensor assembly unit 122 in FIG. 4 is sensitive to vibrations of the axle 12. These vibrations are considered to be noise and thus decrease the signal-to-noise ratio (SNR) of the measurements.

Figure 5A:
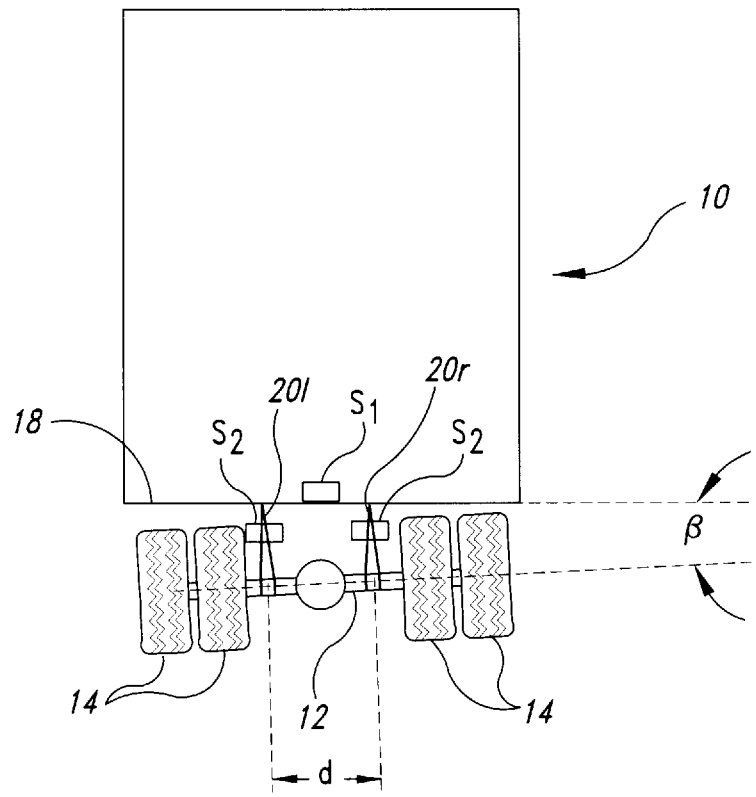
FIG. 5A is a rear view of a semi-tractor-trailer combination illustrating an alternative placement of sensor units with the system of FIG. 2A.

In a different configuration of the sensor assembly 122, illustrated in FIG. 5A, the sensor assembly 122 (see FIG. 2A) comprises the first sensor unit $S_1$ mounted on the frame 18, a second sensor unit $S_2$ mounted on a trailing arm 20l on the suspension system 15 of the vehicle 10 on the left side of the axle 12. A third sensor unit $S_3$ is mounted on a trailing arm 20r of the suspension system 15 of the vehicle 10 on the right side of the axle 12. The signals from the three sensor units $S_1$, $S_2$, $S_3$ are digitized by the ADC 110 (see FIG. 2A) and processed by the CPU 102. The signals from the second sensor unit $S_2$ and third sensor unit $S_3$ are combined to form a differential signal. Mounting the second and third sensor units $S_2$ and $S_3$ on the trailing arms 20l and 20r, respectively, reduces the sensitivity of the sensor units to error caused by vibrations. In addition, the differential signal generated by the CPU 102 further reduces the noise caused by road vibrations since both the second and third sensor units $S_2$ and $S_3$ are exposed to similar road vibrations. The differential signal also reduces error caused by other factors, such as road grade or braking of the vehicle 10 in such situations, both sensors $S_2$ and $S_3$ measure substantially the same tilt angle caused by the road grade or braking effects and produce a zero differential output signal in response to these external influences. Thus, the differential signal generated by the sensor units $S_2$ and $S_3$ provides a more accurate measure of the angle $\beta$ than can be provided with a single sensor unit $S_2$ mounted directly on the axle 12 (see FIG. 4).

Figure 5B:
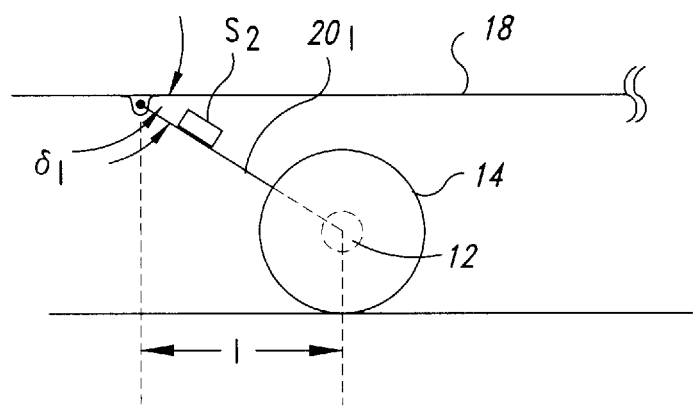
FIG. 5B is a partial left side view of the semi-tractor-trailer combination of FIG. 5A further illustrating the sensor placement and parameters measured by the system of FIG. 2A.

FIG. 5B illustrates a side view of the differential sensor mounting and shows the second sensor unit $S_2$ mounted on the left trailing arm 20l. The trailing arm 20l is pivotally attached to the frame 18 to define a variable angle $\gamma_l$, the third sensor unit $S_3$ is similarly mounted on the right trailing arm 20r (see FIG. 5A). The right trailing arm 20r and the frame 18 define a variable angle $\gamma_r$. The horizontal distance between the pivot point coupling the trailing arms 20l and 20r to the axle 12 is illustrated in FIG. 5B by the term e. The second and third sensor units $S_2$ and $S_3$ are separated by a distance d (see FIG. 5A). It should be noted that the distances d and e are fixed for a particular vehicle 10. Through the use of well known trigonometric functions, the various angles and distances are interrelated by the following:

$$\frac{d}{e} = \frac{\sin\gamma_l - \sin\gamma_r}{\sin\beta} \quad (9)$$

where all terms have been previously defined.

The angle $\beta$ between the axle 12 and the frame 18 is less than 10°, and, under normal conditions, is much less than 10°. Under such circumstances, the system 100 uses a linear approximation for the sine functions in equation (9). The angles $\beta$, $\gamma_l$ and $\gamma_r$ are directly measured and provide a technique for the direct measurement of $\beta$, using the following:

$$\beta = \frac{e}{d}(\gamma_l - \gamma_r) \quad (10)$$

where all terms have been previously defined.

The calculated angle $\beta$ and the rate of change of $\beta$ with respect to time, $$\frac{d\beta}{dt},$$

may be substituted into equation (8) to determine the roll moment $\vec{M}$. As previously discussed, the constant $k_s$ is a measure of suspension stiffness that depends on the geometry of the suspension system 15 (see FIGS. 1A and 1B). It should be noted that $k_s$ may vary slightly if the vehicle 10 uses an air suspension spring. However, such minor variation can be safely ignored. The constant $C_s$ is a measure of the roll damping of the suspension that depends on the geometry of the suspension system 15.

The horizontal force $\vec{H}$ is defined by the following:

$$\vec{H} = a\vec{V} \quad (11)$$

where all terms have been previously defined. The lateral acceleration a is measured by the sensor unit $S_1$ (see FIGS. 4 and 5A). As previously described, the sensor $S_1$ provides a measure of the tilt angle of the frame 18. The tilt angle, defined as $\delta$, is used to define the lateral acceleration a using the following:

$$a = \tan\delta \quad (12)$$

where all terms have been previously defined.

The remaining variable parameter measured by the system 100 is the vertical force $\vec{V}$ exerted by the load of the vehicle 10 including the frame 18 and the load within the vehicle. A number of different techniques may be used to determine the vertical force $\vec{V}$. With a vehicle, such as an automobile, van, bus, or the like, the vehicle weight can be divided by the number of axles. While such measurements do not take into account the weight of the passengers, this weight is generally small compared to the vehicle weight itself. Alternatively, vehicles such as tractor-trailer combinations, can measure the vertical force $\vec{V}$ using truck scales where each pair of axle sets is independently measured to derive the total vehicle weight. The measured weight for the axle associated with the sensor assembly 122 (see FIG. 2A) is used for the value $\vec{V}$. A direct measure of the vertical force $\vec{V}$ can be determined with an air spring suspension system by measuring the air pressure in the spring itself. The vertical force $\vec{V}$ equals the air pressure in the spring times the effective area of the spring. This value may be scaled by a constant indicative of the geometry of the air spring, such as the displacement distance of the air spring from the axle. Thus, a number of techniques may be successfully employed to determine the value for the vertical force $\vec{V}$.

Having described techniques for measuring or calculating constants and variables, the system 100 can readily calculate the load transfer ratio LTR using equations (4), (5) and (6) and the effective height of the center of gravity using equations (6) and (7). Thus, the system 100 advantageously provides a low cost and effective technique to provide the vehicle operator with an indication of the likelihood of the vehicle 10 to roll over. The vehicle operator can use this information to operate the vehicle more safely and thus reduce the occurrence of rollover accidents.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for the detection of vehicle roll-over conditions, the system comprising:
   a sensor assembly coupled to the vehicle and generating signals indicative of a lateral load transfer of the vehicle and a lateral acceleration of the vehicle;
   a roll moment calculator coupled to said sensor assembly to calculate a roll moment based on said signals;
   a center of gravity calculator coupled to said sensor assembly to calculate an effective center of gravity of the vehicle based on said roll moment and lateral acceleration of the vehicle;
   a roll moment display coupled to said roll moment calculator to provide a visual display indicative of said roll moment; and
   a center of gravity display to provide a visual display indicative of said effective center of gravity of the vehicle to provide an indication of the likelihood of the vehicle to roll over.

2. The system of claim 1 wherein said roll moment calculator calculates a lateral load transfer ratio indicative of an actual roll moment compared to a maximum roll moment, said roll moment display indicating said lateral load transfer ratio.

3. The system of claim 1 wherein the vehicle includes a body and a suspension system associated with a vehicle axle and said sensor assembly comprises first, second and third sensor units, said first sensor unit being oriented to provide said signals indicative of lateral acceleration of the vehicle body, said second and third sensor units being oriented to provide said signals indicative of lateral load transfer in the suspension system.

4. The system of claim 3 wherein said first sensor unit is mounted on the vehicle body to provide said signals indicative of lateral acceleration.

5. The system of claim 3 wherein said second and third sensor units are mounted on opposing sides of the vehicle axle to provide said signals indicative of lateral load transfer from one side of the vehicle axle to the opposing side of the vehicle axle.

6. The system of claim 5 wherein said roll moment calculator generates a differential signal from said signals generated by said second and third sensor units to determine lateral load transfer.

7. The system of claim 1 wherein the vehicle includes a body and a suspension system associated with a vehicle axle and said sensor assembly comprises first and second sensor units, said first sensor unit being oriented to provide said signals indicative of lateral acceleration of the vehicle body, said second sensor unit being oriented to detect a tilt angle in the suspension system.

8. The system of claim 7 wherein said first sensor unit is mounted on the vehicle body to detect lateral acceleration.

9. The system of claim 7 wherein said second sensor unit is mounted on the vehicle axle to detect the tilt angle of the vehicle axle.

10. The system of claim 1 wherein said sensor assembly comprises at least two optical tilt sensors capable of generating said signals indicative of lateral acceleration and lateral load transfer.

11. The system of claim 1 wherein said roll moment and center of gravity displays comprise first and second bar graph displays, respectively, said first bar graph display having a substantially horizontal display orientation to indicate lateral load transfer and said second bar graph display having a substantially vertical display orientation to indicate said calculated effective center of gravity of the vehicle.

12. The system of claim 1 wherein said roll moment display is a color display and displays lateral load transfer in a first color when lateral load transfer is below a predetermined threshold and displays lateral load transfer in a second color when lateral load transfer is above said predetermined threshold.

13. The system of claim 1, further including an audio transducer to generate an alert signal when lateral load transfer is above a predetermined threshold.

14. The system of claim 1 wherein the vehicle has a drive axle and said sensor assembly is associated with the drive axle to sense lateral acceleration and lateral load transfer at the drive axle.

15. The system of claim 1 wherein the vehicle is a tractor-trailer having at least one drive axle, said sensor assembly being mounted in proximity with the at least one drive axle to provide said signals indicative of lateral acceleration and lateral load transfer at the at least one drive axle.

16. The system of claim 1 wherein the vehicle is a tractor-trailer having a plurality of trailer portions each having an axle, said sensor assembly being mounted in proximity with the axle of one of the trailer portion axles to provide said signals indicative of lateral acceleration and lateral load transfer at the trailer portion axle.

17. The system of claim 1 wherein the vehicle is a tractor-trailer having a plurality of trailer portions each having an axle, the system further including a plurality of sensor assemblies mounted in proximity with at least two of the plurality of trailer portion axles to provide said signals indicative of lateral acceleration and lateral load transfer at the trailer portion axles.

18. The system of claim 1 wherein the vehicle includes a body and a suspension system associated with a vehicle axle and said roll moment calculator calculates said roll moment by determining an angle formed between the body and the axle.

19. The system of claim 18 wherein the vehicle suspension system has a predetermined stiffness and said roll moment calculator calculates said roll moment using said angle formed between the body and the axle and a constant indicative of the predetermined stiffness of the suspension system.

20. The system of claim 1, further including means for determining a static load applied to the vehicle, said roll moment calculator further calculating a ratio of lateral load transfer and said static load.

21. The system of claim 20 wherein said roll moment display provides an indication of said ratio of lateral load transfer and said static load.

22. The system of claim 1, further including a gating signal applied to said center of gravity calculator, said center of gravity calculator calculating said effective center of gravity only when said gating signal is applied.

23. The system of claim 22 wherein said gating signal applied to said center of gravity calculator when said lateral acceleration is above a predetermined threshold.

24. The system of claim 22, further including a data storage location to store said calculated center of gravity when said gating signal is not applied to said center of gravity calculator, said center of gravity display indicating said calculated center of gravity when said gating signal is applied and indicating said stored said calculated center of gravity when said gating signal is not applied.

25. The system of claim 1, further including a data storage location to store a data value for said calculated roll moment if said calculated roll moment exceeds a predetermined threshold.

26. The system of claim 25 wherein said data storage location stores a plurality of calculated roll moment values indicative of each time that said calculated roll moment exceeds said predetermined threshold, said roll moment display including a display of each of said plurality of calculated roll moment values.

27. The system of claim 1 wherein said roll moment calculator and said center of gravity calculator are portions of a single processor.

28. The system of claim 27 wherein said roll moment display and said center of gravity display are portions of a single display.

29. A system for the detection of vehicle roll-over conditions, the system comprising:

a sensor assembly coupled to the vehicle and generating signals indicative of a lateral load transfer of the vehicle and a lateral acceleration of the vehicle;

a lateral load transfer ratio processor coupled to said sensor assembly to calculate a lateral load transfer ratio indicative of an actual lateral load transfer compared to a maximum lateral load transfer;

a center of gravity processor coupled to said sensor assembly to calculate an effective center of gravity of the vehicle;

a lateral load transfer ratio display coupled to said lateral load transfer ratio processor to provide a visual display indicative of said lateral load transfer ratio; and a center of gravity display to provide a visual indication of the effective center of gravity of the vehicle to provide an indication of the likelihood of the vehicle to roll over.

30. The system of claim 29 wherein the vehicle includes a body and a suspension system associated with a vehicle axle and said sensor assembly comprises first, second and third sensor units, said first sensor unit being oriented to provide said signals indicative of lateral acceleration of the vehicle body, said second and third sensors units being oriented to provide said signals indicative of lateral load transfer in the suspension system.

31. The system of claim 30 wherein said first sensor unit is mounted on the vehicle body to provide said signals indicative of lateral acceleration.

32. The system of claim 30 wherein said second and third sensor units are mounted on opposing sides of the vehicle axle to provide said signals indicative of load transfer from one side of the vehicle axle to the opposing side of the vehicle axle.

33. The system of claim 32 wherein said lateral load transfer ratio processor generates a differential signal from said signals generated by said second and third sensor units to determine said lateral load transfer.

34. The system of claim 29, further including a gating signal applied to said lateral load transfer ratio processor, said lateral load transfer ratio processor calculating said effective center of gravity only when said gating signal is applied.

35. The system of claim 34 wherein said gating signal applied to said lateral load transfer ratio processor when said lateral acceleration is above a predetermined threshold.

36. The system of claim 34, further including a data storage location to store said calculated center of gravity when said gating signal is not applied to said lateral load transfer ratio processor, said display indicating said calculated center of gravity when said gating signal is applied and indicating said stored said calculated center of gravity when said gating signal is not applied.

37. The system of claim 29 wherein said lateral load transfer ratio processor and said center of gravity processor are portions of a single processor.

38. The system of claim 29 wherein said lateral load transfer ratio display and said center of gravity display are portions of a single display.

39. A method for the detection of vehicle roll-over conditions, the method comprising the steps of:

generating signals indicative of a lateral load transfer of the vehicle and a lateral acceleration of the vehicle using a sensor assembly coupled to the vehicle;

calculating a roll moment based on said signals;

calculating an effective center of gravity of the vehicle based on said roll moment and lateral acceleration of the vehicle; and displaying data indicative of said calculated roll moment and said calculated effective center of gravity of the vehicle to provide an indication of the likelihood of the vehicle to roll over.

40. The method of claim 39 wherein said step of calculating a roll moment calculates a lateral load transfer ratio indicative of an actual roll moment compared to a maximum roll moment and said step of displaying data displays data indicating said lateral load transfer ratio.

41. The method of claim 39 wherein the vehicle includes a body and a suspension system associated with a vehicle axle and said sensor assembly comprises first, second and third sensor units, said first sensor unit being oriented to provide said signals indicative of lateral acceleration of the vehicle body, said second and third sensor units being oriented to provide said signals indicative of lateral load transfer in the suspension system, said step of calculating a roll moment using said signals generated by said first, second and third sensor units.

42. The method of claim 41 wherein said first sensor unit is mounted on the vehicle body to provide said signals indicative of lateral acceleration.

43. The method of claim 41 wherein said second and third sensor units are mounted on opposing sides of the vehicle axle to provide said signals indicative of load transfer from one side of the vehicle axle to the opposing side of the vehicle axle.

44. The method of claim 41 wherein said step of calculating said roll moment generates a differential signal from said signals generated by said second and third sensor units to determine the lateral load transfer.

45. The method of claim 39 wherein the vehicle includes a body and a suspension system associated with a vehicle axle and said sensor assembly comprises first and second sensor units, said first sensor unit being oriented to provide said signals indicative of lateral acceleration of the vehicle body, said second sensor units being oriented to provide said signals indicative of lateral load transfer in the suspension system, said step of calculating a roll moment using said signals generated by said first and second sensor units.

46. The method of claim 45 wherein said first sensor unit is mounted on the vehicle body to provide said signals indicative of lateral acceleration.

47. The method of claim 45 wherein said second sensor unit is mounted on the vehicle axle to provide said signals indicative of load transfer from one side of the vehicle axle to the opposing side of the vehicle axle.

48. The method of claim 39 wherein said sensor assembly comprises at least two optical tilt sensors capable of generating said signals indicative of lateral acceleration and lateral load transfer, said step of calculating said roll moment using said signals generated by said optical tilt sensors.

49. The method of claim 39, further including the step of storing a data value for said calculated roll moment if said calculated roll moment exceeds a predetermined threshold.

50. The method of claim 49 wherein said step of storing stores a plurality of calculated roll moment data values indicative of each time that said calculated roll moment exceeds said predetermined threshold, the method further including the step of displaying each of said plurality of calculated roll moment values.

* * * * *